United States Patent
Thome (10) Patent No.: US 11,584,301 B1
(45) Date of Patent: Feb. 21, 2023

(54) FRAME-MOUNTED KICKOUT STEP FOR VEHICLES

(71) Applicant: Alan Thome, Queen Creek, AZ (US)

(72) Inventor: Alan Thome, Queen Creek, AZ (US)

(*) Notice: Subject to any disclaimer, the term of this patent is extended or adjusted under 35 U.S.C. 154(b) by 0 days.

(21) Appl. No.: 17/961,770

(22) Filed: Oct. 7, 2022

Related U.S. Application Data (60) Provisional application No. 63/253,212, filed on Oct. 7, 2021.

(51) Int. Cl.
*B60R 3/00* (2006.01)

(52) U.S. Cl.
CPC ........................................ *B60R 3/00* (2013.01)

(58) Field of Classification Search
CPC ............ B60R 3/00; B60R 3/002; B60R 3/007
See application file for complete search history.

(56) References Cited

U.S. PATENT DOCUMENTS

| | | | |
|---|---|---|---|
| 3,980,319 A | 9/1976 | Kirkpatrick | |
| 4,017,093 A * | 4/1977 | Stecker, Sr. | B60R 3/00 280/163 |
| 4,982,974 A | 1/1991 | Guidry | |
| 5,193,829 A * | 3/1993 | Holloway | B60R 3/002 280/166 |
| 6,481,733 B1 * | 11/2002 | Shellabarger | B60R 3/00 280/169 |
| 8,056,913 B2 | 11/2011 | Kuntze | |
| 8,833,783 B2 | 9/2014 | Statz | |
| 9,346,405 B2 | 5/2016 | Leitner | |
| 10,195,997 B2 | 2/2019 | Smith | |
| 2008/0116652 A1 * | 5/2008 | Storer | B60R 3/00 280/164.1 |
| 2008/0231013 A1 * | 9/2008 | Richardson | B60R 3/00 280/163 |
| 2009/0184485 A1 * | 7/2009 | Castillo | B60R 3/002 293/126 |
| 2015/0091270 A1 * | 4/2015 | Stanesic | G06T 1/20 29/469 |

* cited by examiner

*Primary Examiner* — Bryan A Evans
(74) *Attorney, Agent, or Firm* — Michael C. Balaguy (57) ABSTRACT

A vehicle kickout step is adapted to affix to a box frame of a vehicle and provide a step for users to enter the vehicle. This step may be bolted to the box frame, requiring no cutting, welding, or other permanent modification of the vehicle. Additionally, the step does not regress below the box frame, ensuring that use of the kickout step does not adversely affect the ground clearance of the vehicle. Further, the steps may serve the additional function of a rock slider, giving the body of the vehicle some measure of protection from loose or rigid obstacles when off-roading.

11 Claims, 11 Drawing Sheets

FRAME-MOUNTED KICKOUT STEP FOR VEHICLES

CROSS-REFERENCE TO RELATED APPLICATION(S)

The present application is related to and claims priority to U.S. Provisional Patent Application No. 63/253,212 filed Oct. 7, 2021, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicle accessories of existing art and more specifically relates to a frame-mounted kickout step system.

RELATED ART

It is desirable to have a vehicle which has large ground clearance in many applications. Off-road vehicles, for example, need significant ground clearance to overcome obstacles. Trucks and other towing vehicles may require ground clearance simply as a byproduct of producing a vehicle with sufficient height and mass to two heavy payloads. In any instance, such vehicles with significant distance between the floor of the vehicle in the ground may inhibit entry for diminutive individuals. As a result, the relevant prior art teaches many solutions for creating an intermediate step between the vehicle cab and the ground. These solutions include single steps, tiered steps, running boards, and others. Such solutions introduce an immediate problem in that they frustrate the original purpose and having a vehicle with large ground clearance. An off-road vehicle with running boards is less capable than one without, since the running boards will contact large obstacles and may even entrap the vehicle by high-centering on the obstacle. Such solutions also introduce air drag and may appear bulky and unsightly. A superior solution is desired which offers an intermediate step to assist shorter persons in entering the vehicle, but which does not meaningfully reduce ground clearance or aerodynamics. In addition, maximum simplicity, ruggedness, and modularity is desired.

Various attempts have been made to solve problems found in automobile art. Among these are found in: U.S. Pat. Nos. 4,982,974, 8,056,913, 9,346,405, 10,195,997, 3,980,319, and 8,833,783. This prior art is representative of prior art attempts to ease entry into vehicles. However, for the applications described above, a need for a yet superior solution is perceived.

None of the above inventions and patents, taken either singly or in combination, is seen to describe the invention as claimed. Thus, a need exists for a reliable frame-mounted kickout step for vehicles, and to avoid the above-mentioned problems.

SUMMARY OF THE INVENTION

The present invention advantageously fills the aforementioned deficiencies by providing a novel frame-mounted kickout step for vehicles. The present invention is superior to other systems in that it effectively forms stepping surfaces for entering a high-clearance vehicle without compromising other desirable characteristics of such a vehicle.

A vehicle kickout step is adapted to affix to a box frame of a vehicle and provide a step for users to enter the vehicle. This step may be bolted to the box frame, requiring no cutting, welding, or other permanent modification of the vehicle. Bolt patterns may be offered for a variety of vehicle frames. Additionally, the step does not regress below the box frame, ensuring that use of the kickout step does not adversely affect the ground clearance of the vehicle. Further, the steps may serve the additional function of a rock slider, having a sloped profile to displace the vehicle off of obstacles, giving the body of the vehicle some measure of protection from loose or rigid obstacles when off-roading. A supplementary step is also disclosed which eliminates some of the features and bulk of the kickout step, such that if multiple steps are desired for four-door vehicles, the system may be lightened and redundant features not repeated.

Advantageously, the kickout step is two-tiered, providing two step portions. A threaded bore permits installation of a screw-in coil antenna that may be digitally linked to a system for detecting large obstacles. Each end of the step features an endplate for mounting the steps to the box frame, and these are each provided with a U-hook or eye-hook for affixing ropes and cables. In some embodiments, the kickout step may be provided in a kit with a grab-bar for installation inside the vehicle to be used as a hand bar in tandem with the kickout step.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present invention, a frame-mounted kickout step for vehicles, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present disclosure relate to a modular accessory system for vehicles and more particularly to a frame-mounted kickout step system as used to improve the ease of entry into vehicles.

Generally, a modular step system enables users to more easily enter vehicles. Most notably, the step system is optimized for high-clearance four-wheel drive vehicles with box frames such as trucks and sports utility vehicles. However, additional vehicles to which the frame-mounted kickout step system may be applicable for includes helicopters, tractors, and other vehicles.

Referring now more specifically to the drawings by numerals of reference, there is shown in FIGS. 1-11, various views of a kickout step system 100.

Figure 1:
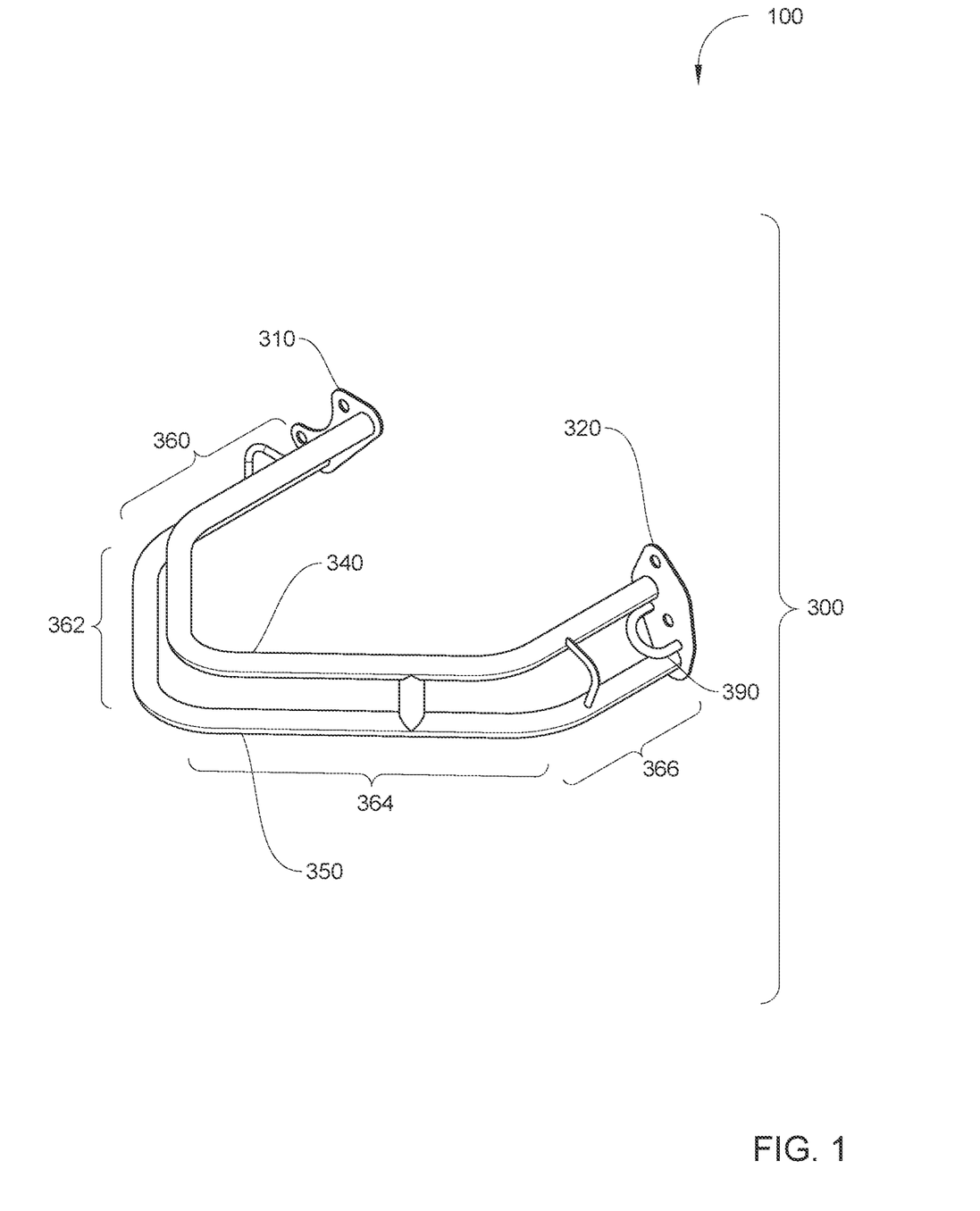
FIG. 1 is a perspective view of a kickout step system for vehicles showing a frame-mounted kickout step assembly according to an embodiment of the present invention.
Figure 4:
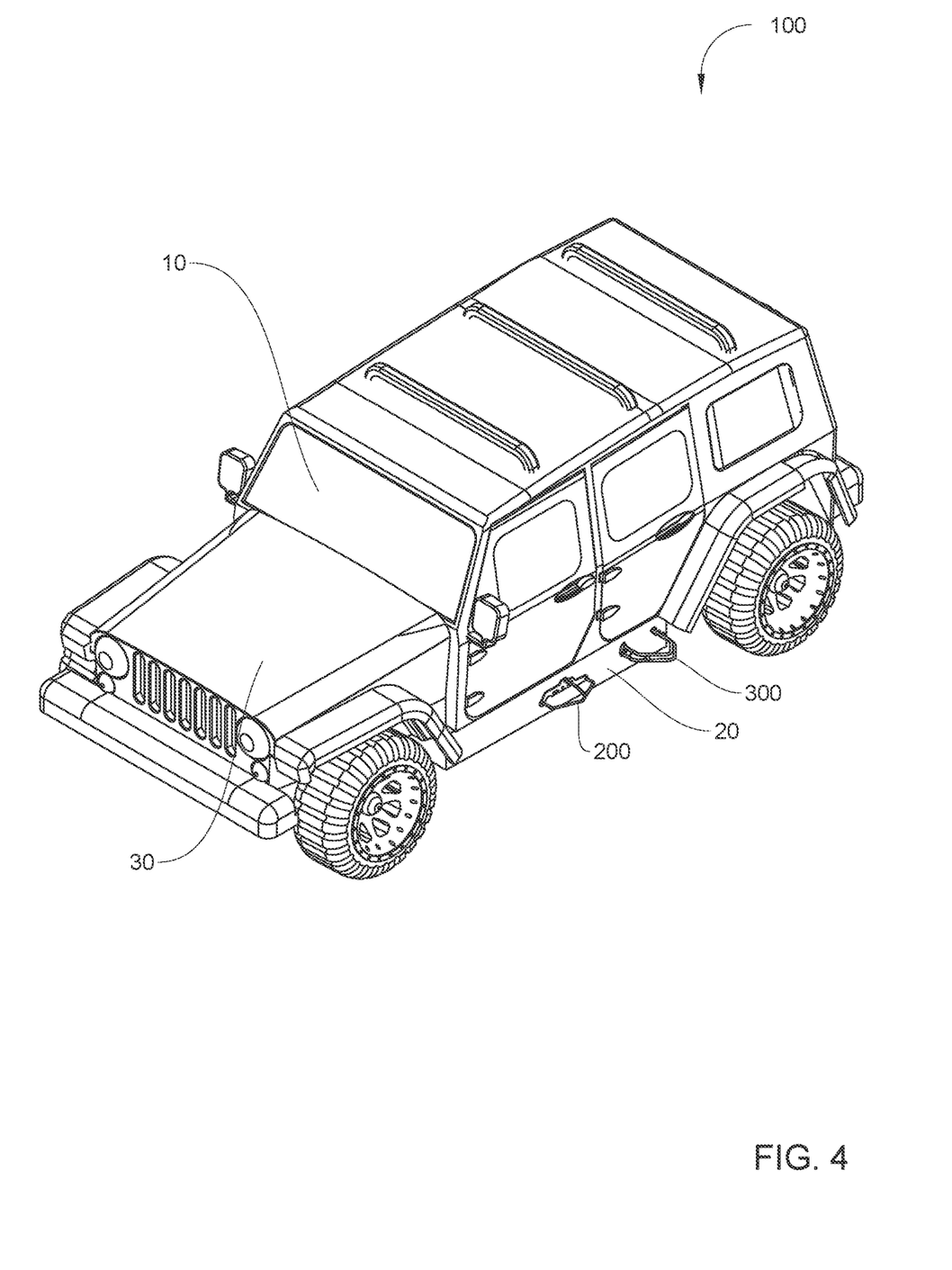
FIG. 4 is a perspective view of the kickout step system of FIG. 1 illustrating both the frame-mounted kickout step and a supplementary-kickout step mounted to a frame of the vehicle, according to an embodiment of the present disclosure.

FIG. 1 shows a frame-mounted kickout step 300 of the kickout step system 100 according to an embodiment of the present disclosure. Here, the kickout step system may be beneficial for use by a user to improve the utility and ease of access for vehicles. As illustrated, frame-mounted kickout step 300 may include first-mount 310 and second-mount 320, each simultaneously able to affix to frame 20 (FIG. 4) of vehicle 10 (FIG. 4). First-mount 310 and second-mount 320 are spanned and joined by each of first-tubular member 340 and second-tubular member 350 as shown. Preferably, first-tubular member 340 is placed above (when mounted to a vehicle) and is smaller and shorter than second-tubular member 350, such that first-tubular member 340 and second-tubular member 350 and usable separately as sequential steps when a user enters into vehicle 10 (FIG. 4), and the separation between them is adequate to securely place a foot upon each of first-tubular member 340 and second-tubular member 350. Each of first-tubular member 340 and second-tubular member 350 may be constructed of roundstock. Preferably, first-tubular member 340 and second-tubular member 350 are constructed of steel tubing and bent on a tubing bender to form the desired trapezoidal shape as illustrated and described herein. Tow loop 390 may be a U-shaped steel member welded or otherwise affixed at each end to either first-mount 310 or second-mount 320. In some embodiments, a pair of tow loops 390 may be provided, accessorizing each of first-mount 310 or second-mount 320. Tow loop (also U-hook, eye-hook) may be useful for affixing rope cables of various types as a recovery cable (for example, from the winch of another vehicle).

Each of first-tubular member 340 and second-tubular member 350 may be characterized by front-cantilever 360 rigidly affixed to first-face 332 of first-mount 310, rear-cantilever 366 rigidly affixed to first-face 332 of second-mount 320, front-support 362 affixed to front-cantilever 360 at an angle between zero and ninety degrees, and rear-support 364 affixed to rear-cantilever 366 at an angle between zero and ninety degrees. Front-support 362 may be affixed to rear-support 364 at an angle greater than zero. Front-cantilever 360, front-support 362, rear-support 364, and rear-cantilever 366 are arranged serially and form a single unitary component. As illustrated, the combination of these components arranged at three obtuse bends form four out of five sides of a trapezoidal shape, with front-cantilever 360 and rear-cantilever 366 being parallel to each other, and front-support 362 and rear-support 364 forming the peak of the trapezoid. Such a trapezoidal shape, with the peak being distal to the vehicle frame when the assembly is mounted, is advantageous because a stepping surface (i.e., of first-tubular member 340 and second-tubular member 350) is able to be extend outwardly from vehicle 10 (FIG. 4) while also being sloped front and back in the area where first-tubular member 340 and second-tubular member 350 is exposed, projecting outwardly from the vehicle frame. In this way, first-tubular member 340 and second-tubular member 350 may serve secondarily as rock slides, able to slide upon rocks and other obstacles, protecting and displacing vehicle 10 (FIG. 4). If first-tubular member 340 and second-tubular member 350 where shaped as three sides of a rectangular, lacking the trapezoidal shape and the slanted angles of front-support 362 and rear-support 364, then first-tubular member 340 and second-tubular member 350 would be a hazard to encountering trail obstacles and make it probable that the vehicle could become caught on such obstacles. Preferably, front-support 362 should be angled at a minimum of twenty degrees relative to the vehicle frame 20 (FIG. 4). On optimal angle range may be within ten degrees of forty-five degrees.

Figure 2:
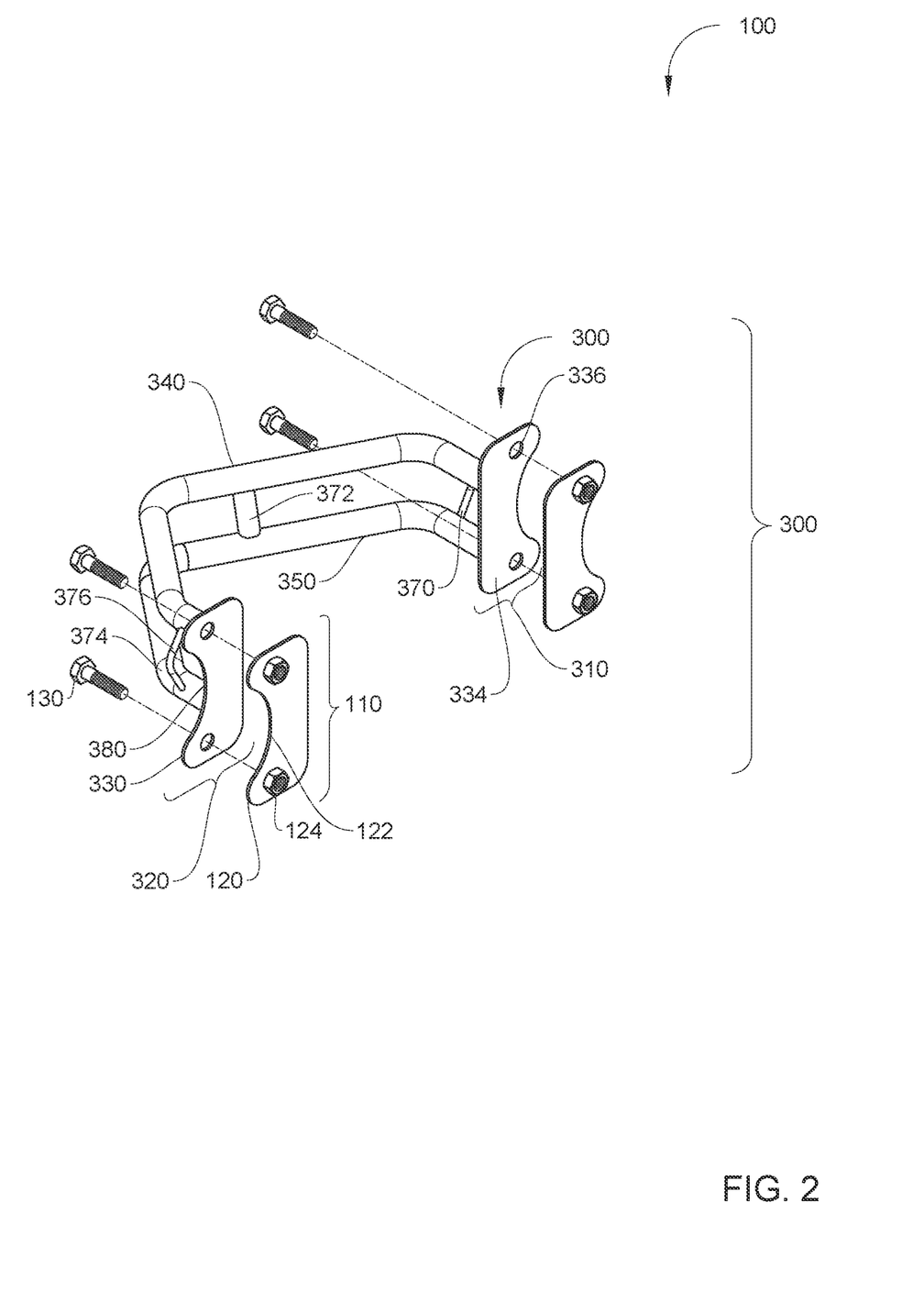
FIG. 2 is a rear view of the frame-mounted kickout step of the kickout step system of FIG. 1, according to an embodiment of the present disclosure.

FIG. 2 shows a rear view of frame-mounted kickout step 300 of the kickout step system 100 of FIG. 1, according to an embodiment of the present disclosure. As before, frame-mounted kickout step 300 includes first-mount 310, second-mount 320, first-tubular member 340, and second-tubular member 350.

First-mount 310 and second-mount 320 each are characterized by flange 330 (flange 330 itself being defined by first-face 332 and second-face 334) and bores 336 which perforated flange 330. Preferably, two bores 336 perforate each flange 330, and are at least as far apart as first-tubular member 340 and second-tubular member 350 are separated from each other, in order to provide strength and rigidity. Furthermore, bores 336 should be placed outwardly from first-tubular member 340 and second-tubular member 350, not within them, as illustrated. Such an arrangement simplifies installation upon vehicle 10 (FIG. 4) so that the span of first-tubular member 340 and second-tubular member 350 do not interfere with tool access. First-face 332 and second-face 334 may define opposite sides of flange 330. Second faces 334 of each of first-mount 310 and second-mount 320 may be coplanar in order to abut with frame 20 (FIG. 4) of vehicle 10 (FIG. 4) simultaneously. Second-plate 320 and first-plate 310 are each lightened by scallops 380.

Each of front-cantilever 360 and the second-cantilever may be affixed perpendicularly to flange 330 of first-mount 310 and flange 330 of second-mount 320 respectively. Fastener-plate 110 is able to be bolted to frame-mounted kickout step 300 to fasten to frame 20 (FIG. 4). Fastener-plate 110 includes flat-plate 120, scallops 122 lightening flat-plate 120, and nuts 124 welded to or placed being flat-plate 120.

Frame-mounted kickout step 300 may also include first cross-member 370, second cross-member 372, and third cross-member 374. Each of first cross-member 370, second cross-member 372, and third cross-member 374 may span and rigidly connect, preferably by welded joints, first-tubular member 340 and second-tubular member 350. First cross-member 370 may affix to each of first-tubular member 340 and second-tubular member 350 at the respective front-cantilevers 360 and 366. Second cross-member 372 may affix to each of first-tubular member 340 and second-tubular member 350 between the respective front-support 362 and rear-support 364. Third cross-member 374 may affix to each of first-tubular member 340 and second-tubular member 350 at the respective rear-cantilevers 360 and 366. Each of first cross-member 370 and third cross-member 374 may be characterized by bend 376, such that first cross-member 370 and third cross-member 374 are each convex relative to frame-mounted kickout step 300. Each of first-mount 310 and second-mount 320 may have concave scallops between the bores along an exterior edge of flange 330.

Figure 3:
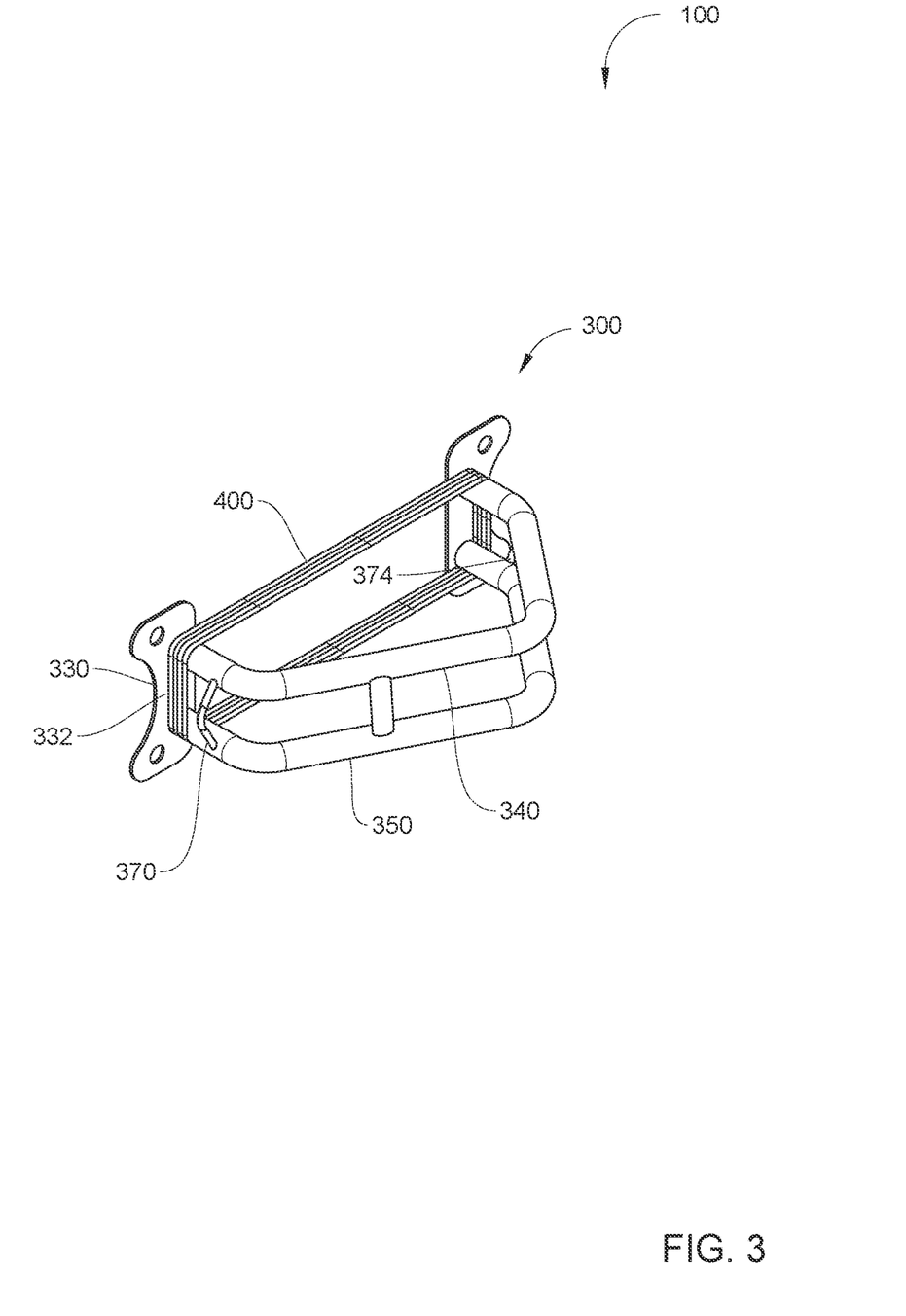
FIG. 3 is a front view of the frame-mounted kickout step of the kickout step system of FIG. 1 with a tow rope stowed upon the frame-mounted kickout step, according to an embodiment of the present disclosure.

FIG. 3 is a front view of frame-mounted kickout step 300 of the kickout step system 100 of FIG. 1 with tow rope 400 stowed upon frame-mounted kickout step 300, according to an embodiment of the present disclosure. As shown, two-rope 400 may be wrapped about first-tubular member 340 and second-tubular member 350 at first-cantilever 360 and second-cantilever 366 of each, such that tow-rope 400 is prevented from sliding off of first-tubular member 340 and second-tubular member 350 by flange 330 of each of first-mount 310 (FIG. 1) and second-mount 320 (FIG. 1) on a rear-side of tow-rope 400, and by first-cross member 370 and third-crossmember 374 on a front side of tow-rope 400. Optionally, a user may choose to tie or otherwise mount an end of tow-rope 400 anywhere upon frame-mounted kickout step 300, including tow-loop 390.

FIG. 4 is a perspective view of the kickout step system 100 of FIG. 1 affixed to a vehicle, according to an embodiment of the present disclosure. As illustrated, vehicle 10 has a frame 20 (ideally a box frame) and a body 30. The kickout step system is optimized for trucks, SUVs, and other vehicles with large steel box frames which are exposed and recessed from the lateral sides beneath the body. In particular, the kickout step system is optimized for four-wheel drive vehicles (e.g., Jeep Rubicon, Ford Bronco, Chevrolet Silverado, etc.), and has been designed to fasten to the structure of these box frames in particular. Bolt patterns disclosed have been designed to be usable with a variety of vehicle frames without modification. Nonetheless, the design is applicable to vehicles of other manufacturer. As seen, frame-mounted kickout step 300 and supplementary-kickout step 200 may each be rigidly affixed to a lateral exposed side of box frame 20, such that the steps extend laterally to the side of vehicle 10 (FIG. 4) beneath the doors, offering a convenient and secure step for entering vehicle 10 (FIG. 4). In some applications, only frame-mounted kickout step 300 may be used, preferably with one on either side of vehicle 10 (FIG. 4). However, in other applications, supplementary-kickout step 200 may be used as well. Supplementary-kickout step 200 offers a lighter-lower-profile version of frame-mounted kickout step 300 which may be desirable to users when mounting steps for four doors.

Figure 5:
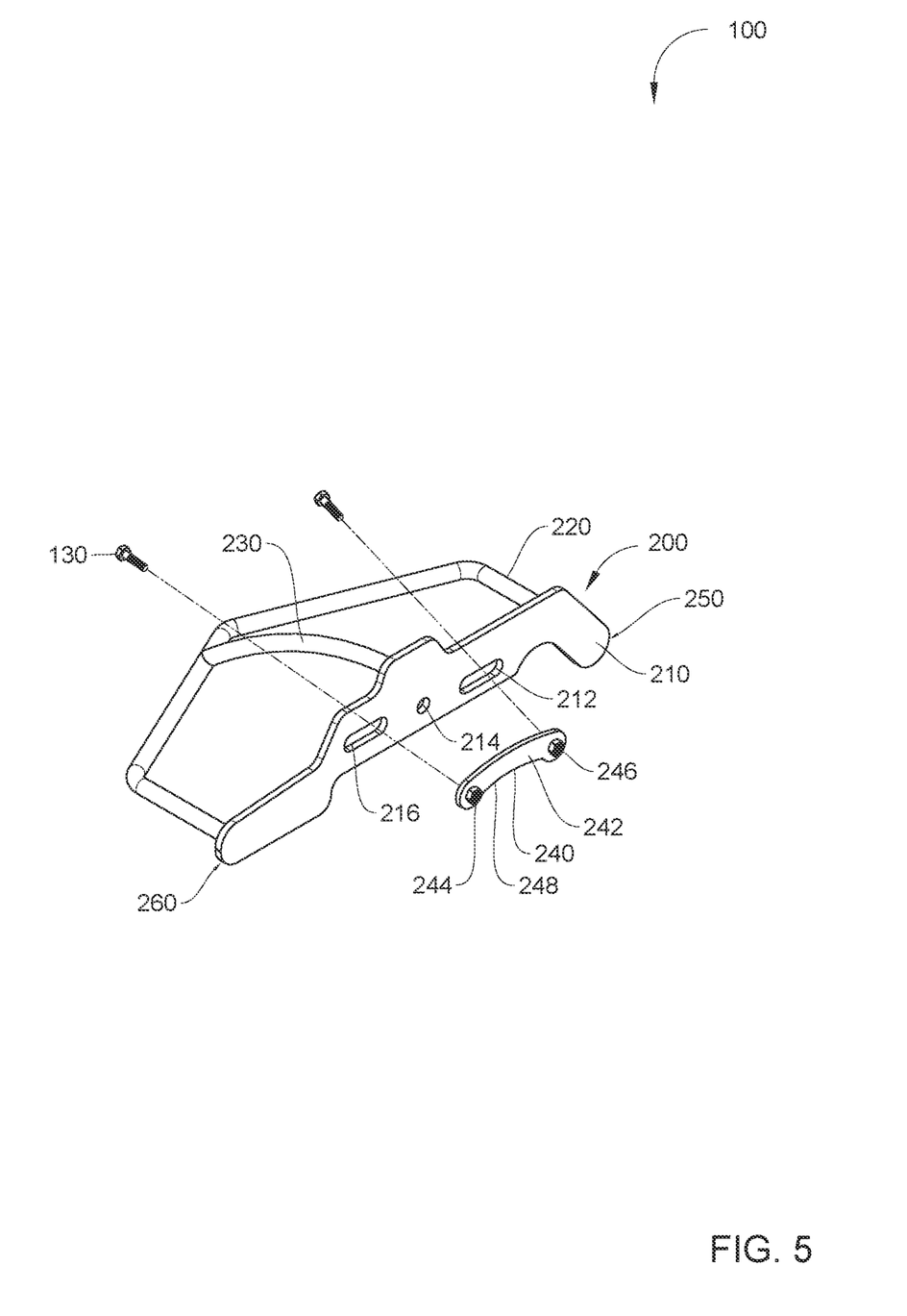
FIG. 5 is a perspective view of the supplementary-kickout step of the kickout step system of FIG. 1 illustrating both the supplementary-kickout step and accompanying frame fasteners, according to an embodiment of the present disclosure.

FIG. 5 is a perspective view of the kickout step system 100 of FIG. 1 supplementary-kickout step 200 which is able to be mounted to frame 20 (FIG. 4) of vehicle 10 (FIG. 4), according to an embodiment of the present disclosure. As shown, vehicle outfitting kit (kickout step system) 100 may include frame-mounted kickout step 300 (FIG. 1). Supplementary-kickout step 200 for a vehicle may be able to be mounted alongside frame-mounted kickout step 300 (FIG. 4). Supplementary-kickout step 200 may be smaller than frame-mounted kickout step 300 (FIG. 4), and is more streamlined and simple, such that if multiple steps are desired by a user (for example with a four-door vehicle), then it may be advantageous to use supplementary-kickout step 200 beneath a front door, and frame-mounted kickout step 300 (FIG. 4) beneath a rear door, or vice versa. Accordingly, supplementary-kickout step 200 includes many of the same features and serves similar purpose to frame-mounted kickout step 300 (FIG. 4), but is lighter and eliminates unnecessary redundant features, and uses a different mounting style in order to better accommodate certain vehicles which have complicate frame shapes and/or patterns underneath the front door. For example, certain vehicle models feature a bent and curved frame (e.g. Ford frames) near the cab mounts underneath the front door, for which the design of frame-mounted kickout step 300 (FIG. 4) would not ideally match.

Figure 6:
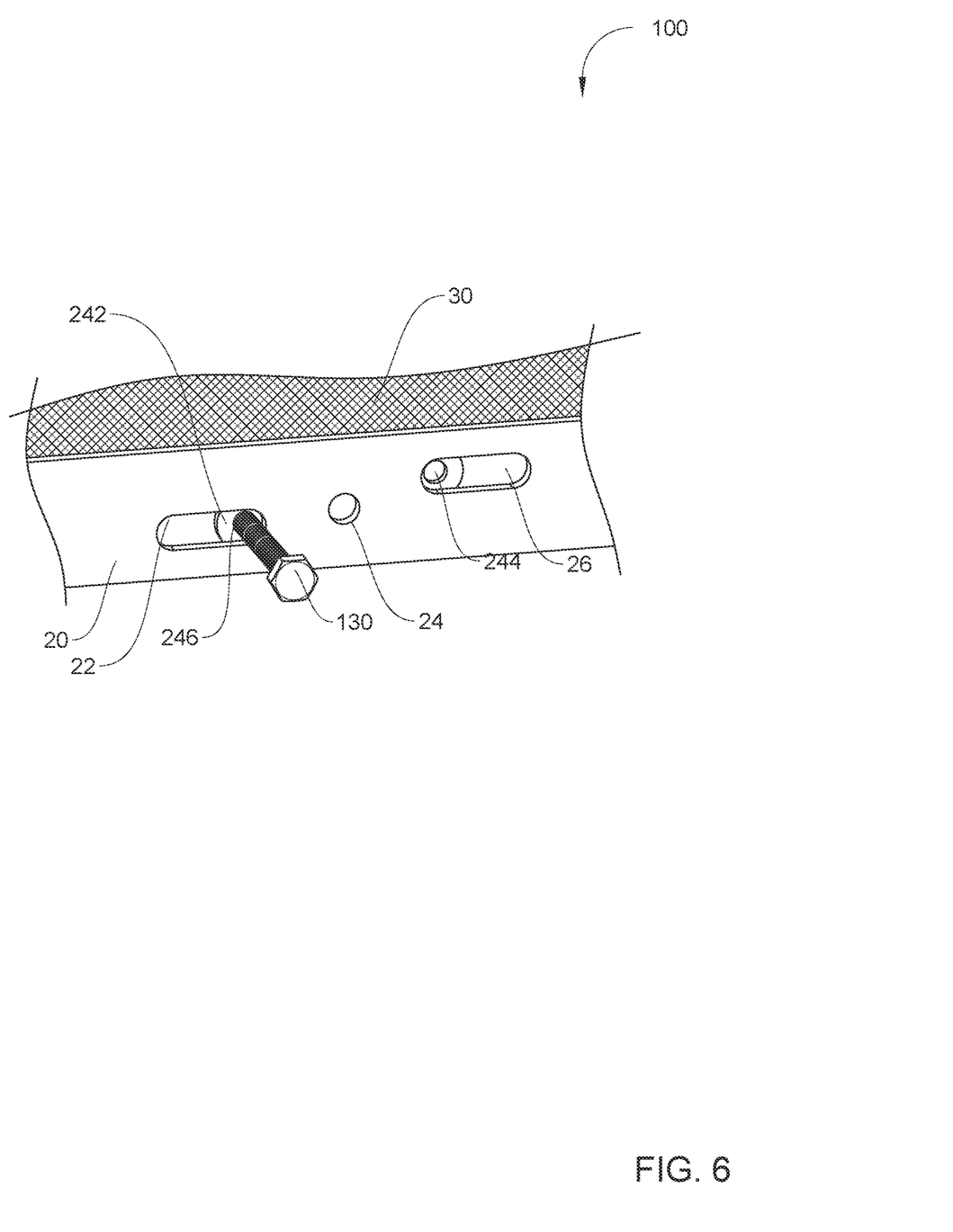
FIG. 6 is a perspective view of the kickout step system of FIG. 1, according to an embodiment of the present disclosure.

As illustrated, supplementary-kickout step 200 may include unitary flange-plate 210, single tubular-step 220, and single brace-member 230. Unitary flange-plate 210 may be perforated by first-plate slot 212, at least one plate-aperture 214, and second-plate slot 216. These slots and apertures are not inline with each other, being staggered to match the pattern of some contemporary vehicle models having matching cuts in the box frame 20 (FIG. 6). As shown, these cuts may be stepped sequentially, with first-plate slot 212 being highest (as defined when supplementary-kickout step 200 is mounted to the vehicle), second-plate slot 216 being lowest, and at least one plate-aperture 214 being in the middle. These slots may also be long enough to provide some choice for custom placement towards the front or rear of the vehicle. Single tubular-step 220 may be rigidly affixed to first-end 250 and second-end 260 of unitary flange-plate 210. Single brace-member 230 may span single tubular-step 220 to the unitary flange plate 210. Unitary flange plate 210 may include a dogleg bend at second-end 260 and an angular bend at first-end 250. Preferably, both of these bends are downwards as illustrated. Such bends are implemented to aid in avoiding frame obstacles when mounting unitary flange plate 210 to particular vehicle models.

Vehicle outfitting kit 100 may also include fastener-plate 240, which is able to be inserted within the frame of vehicle 10 (FIG. 4) (box frames generally being hollow rectangular extrusions) and sandwich one side of the frame of vehicle 10 (FIG. 4) between fastener-plate 240 and frame-mounted kickout step 300 and/or supplementary-kickout step 200, when bolts 130 affix fastener-plate 240 to frame-mounted kickout step 300 and/or supplementary-kickout step 200.

Fastener-plate 240 may include fastener-flange 242, two fastener-bores 246, and two nuts 244, and retention-bore 248. Two fastener-bores 246 may perforate fastener-flange 242 at a separation from each other matching that of the bores of frame-mounted kickout step 300 (FIG. 1) and/or supplementary-kickout step 200. The two nuts 244 may correspond coaxially with two fastener-bores 246 respectively, and may be able to threadably receive bolts 130. Preferably, two nuts 244 are welded to fastener-flange 242 to prevent rotation of nuts 244 when bolts 130 are threaded therein. Retention-bore 248 is a central aperture designed to receive a string or wire threaded therein, such that if fastener-plate 240 falls within the interior of frame 20 (FIG. 4), it may be pulled out.

FIG. 6 is a perspective view of the box frame 20 of the kickout step system 100 of FIG. 1, according to an embodiment of the present disclosure. Here, box frame 20 of vehicle 10 (FIG. 4) is illustrated beneath body 30 of vehicle 10 (FIG. 4). First-frame slot 22, frame-aperture 24, and second-frame slot 26 are shown perforating frame 20 in sequence. As noted earlier, these cuts mirror the slots of unitary flange-plate 210. Note that this illustration of a vehicle frame is an example, and is shown flat. Other usable vehicle frames may include bends, additional or different cuts and apertures, etc. In such cases, frame-mounted kickout step 300 and/or supplementary-kickout step 200 may still be able to mount to these frames without modification to either the steps or the frame. Alternatively, additional bores may be drilled in order to affix frame-mounted kickout step 300 and/or supplementary-kickout step 200.

As illustrated, fastener-plate 240 is shown inserted within the hollow interior of frame 20 and is only partially visible as exposed by first-frame slot 22, frame-aperture 24, and second-frame slot 26. Also visible are the two fastener-bores 246 and the two nuts 244, which must be aligned with the slots and/or aperture in order for bolts 130 to affix to them. Fastener-plate 240 is left loose and unsecured within frame 20 until a step (200 or 300) is installed and bolts 130 affix the step (200 or 300) to fastener-plate 240, with frame 20 sandwiched in between.

Figure 7:
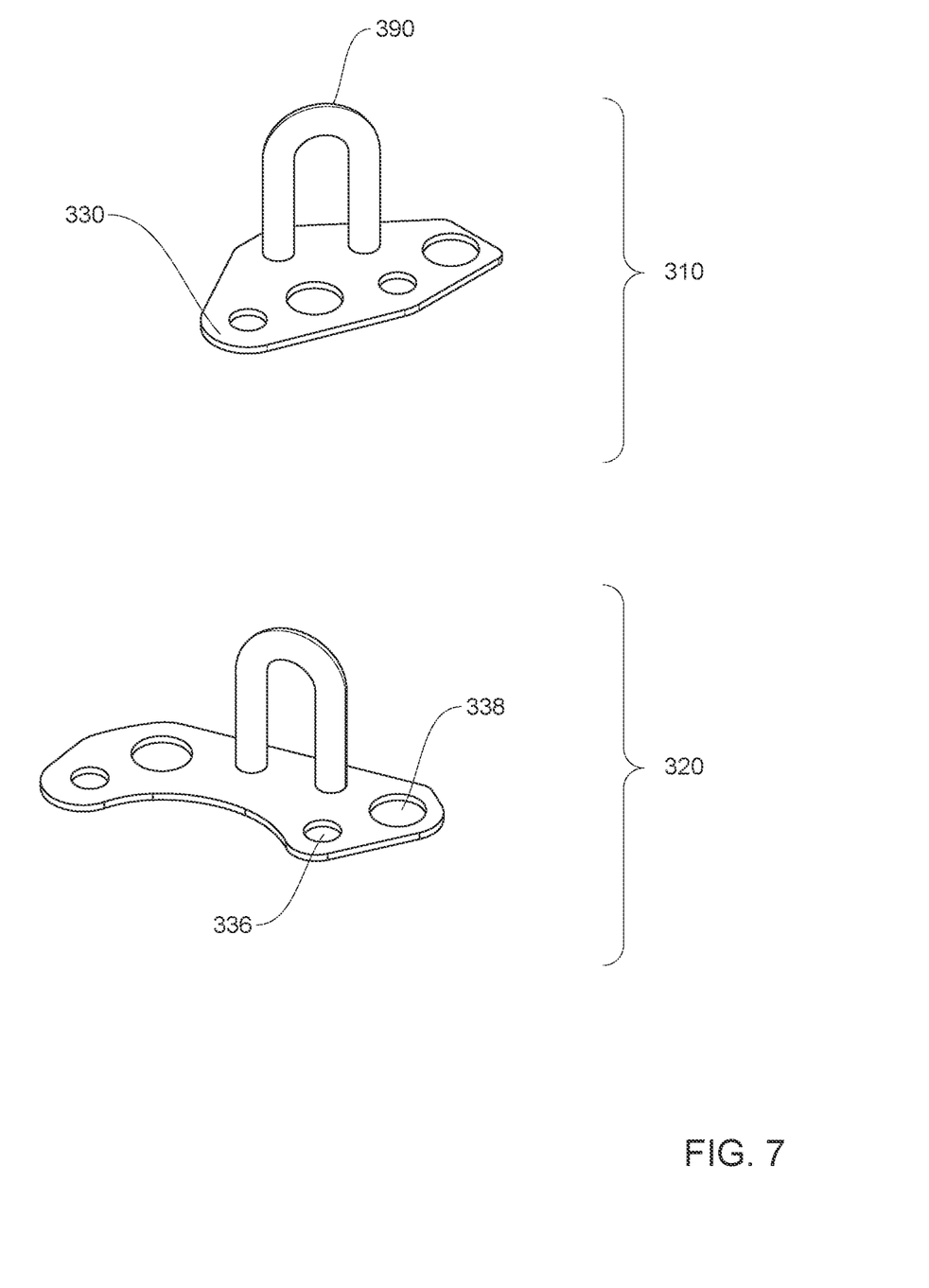
FIG. 7 is a perspective view of a flange and tow loop of the frame-mounted kickout step of kickout step system of FIG. 1, according to an embodiment of the present disclosure.

FIG. 7 is a perspective view of the flange 330 of the frame-mounted kickout step 300 of kickout step system 100 of FIG. 1, according to an embodiment of the present disclosure. Here, flange 330 is shown in an assembly stage, without first-tubular member 340 (FIG. 1) or second-tubular member 350 (FIG. 1) affixed. As shown, bores 336 perforate flange 330. Also shown, exposed, is tow loop bores 338 for receiving tow-loop 390 (FIG. 1) for recovery purposes when they are welded on by a manufacturer. Not that tow loop bores 338 are an optional element, and are mostly shown for demonstration. In manufacturing, it may be preferable that no tow loop bores 338 are drilled, and that tow loop 390 (FIG. 1) is simply welded directly to a flat face of flange 330. As shown, these elements may be present on each of first-mount 310 and second-mount 320, and first-mount 310 and second-mount 320 may be arranged as mirrors of each other.

Figure 8:
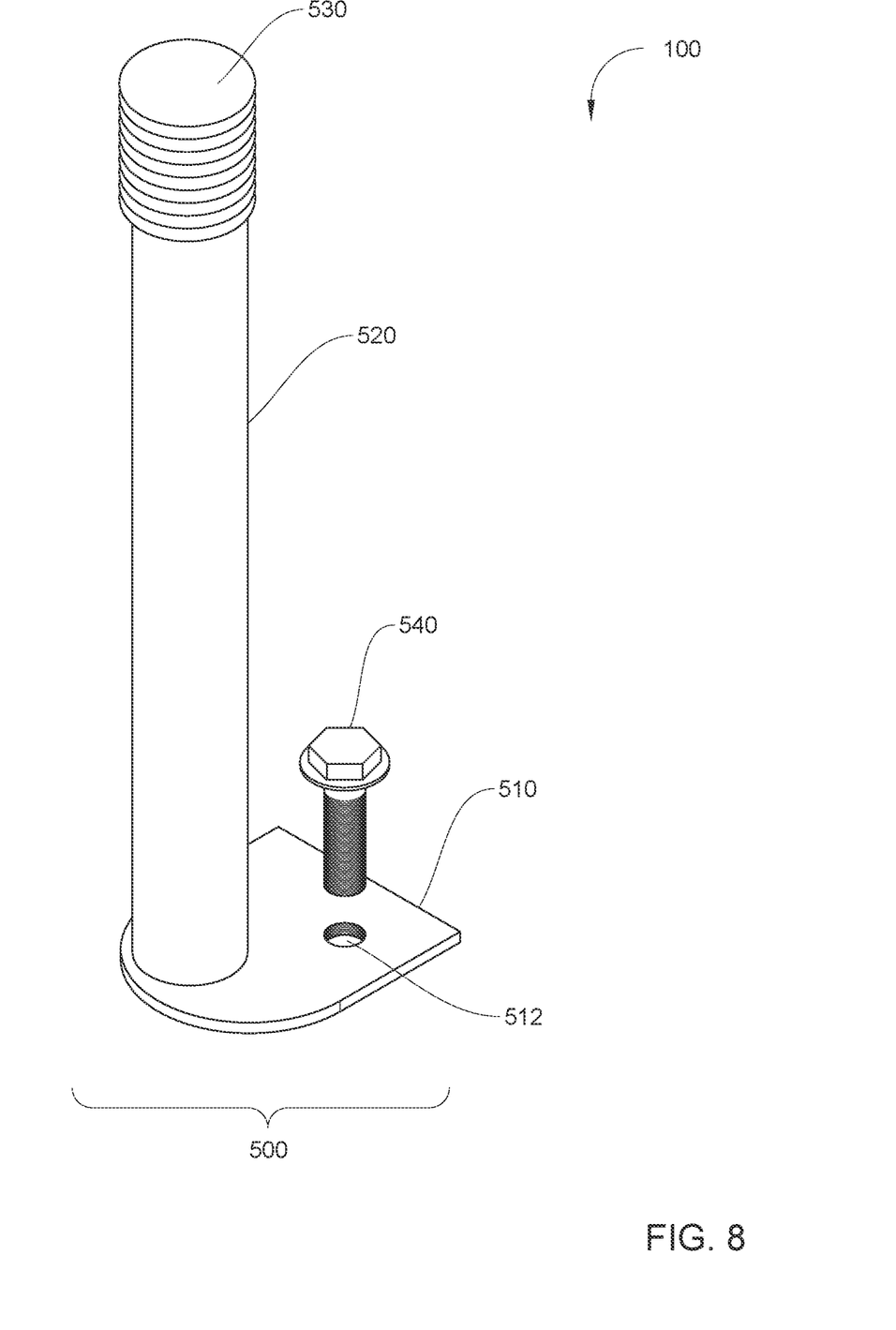
FIG. 8 is a perspective view of a hand-bar of the kickout step system of FIG. 1, according to an embodiment of the present disclosure.

FIG. 8 is a perspective view of the hand-bar 500 of the kickout step system 100 of FIG. 1, according to an embodiment of the present disclosure. Hand-bar 500 may be mountable to an interior of a vehicle, providing a graspable handle for users to lift themselves into vehicle 10 (FIG. 4) with. Hand-bar 500 should be placed between a seat and a door of vehicle 10 (FIG. 4) so that when the door is opened the hand-bar 500 is easily accessible. In combination with a step (200 or 300), hand-bar 500 may significantly increase ease of access for a user (particularly short users) into an interior of high-clearance vehicles.

Hand-bar 500 may include flat handle-flange 510, handle-bore 512, tubular member 520, and cap 530. Handle-flange 510 may be able to abut against a floor of vehicle 10 (FIG. 4), flat handle-flange 510 being perforated by handle-bore 512. Tubular member 520 may be rigidly affixed, perpendicularly, to flat handle-flange 510. Cap 530 may be affixed to an end of tubular member 520 opposing flat handle-flange 510 to protect from injury against the top of handle-bar 500 which projects upwardly from the floor of the vehicle when installed.

Figure 9:
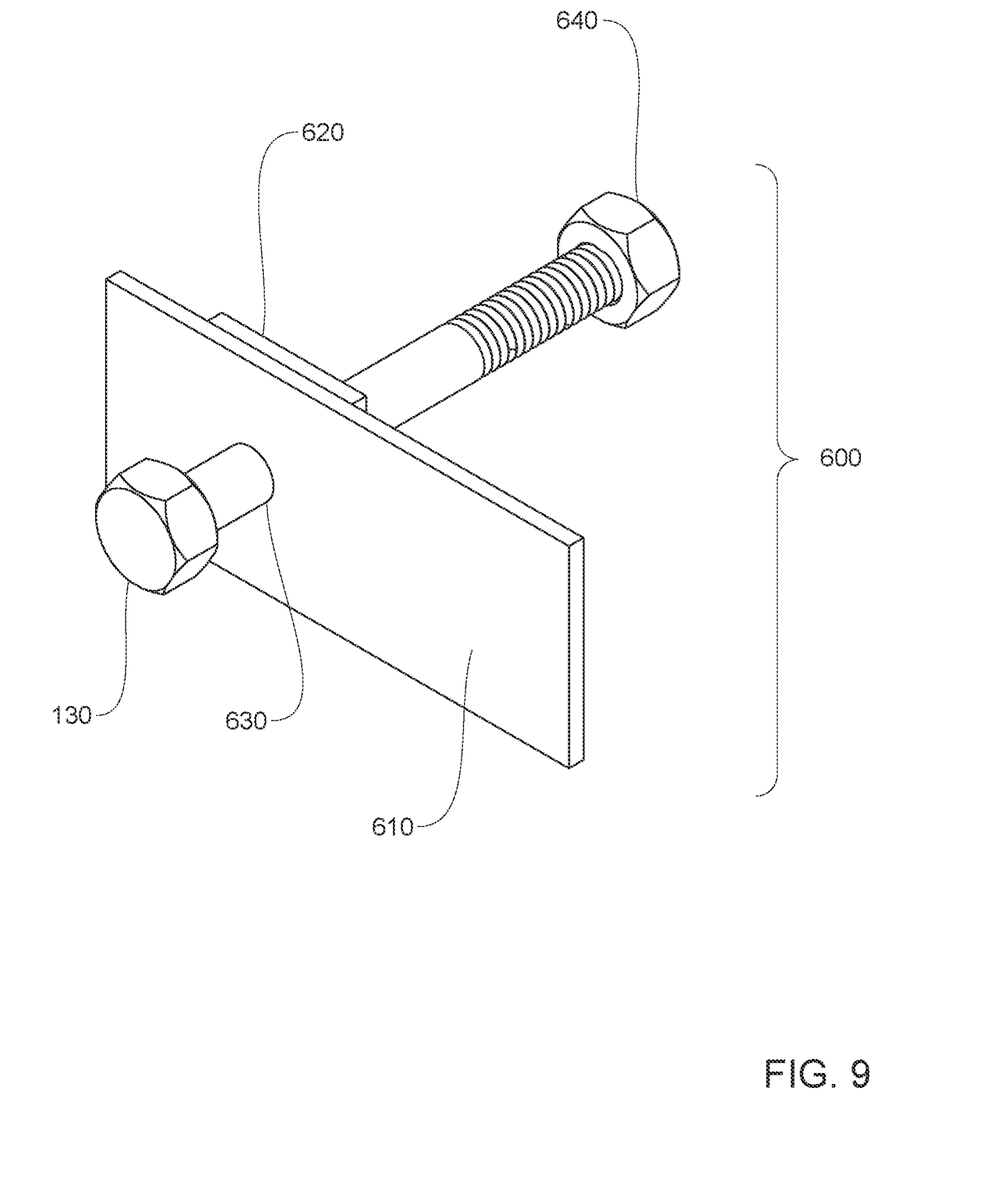
FIG. 9 is a perspective view of a frame-fastener of the kickout step system of FIG. 1, according to an embodiment of the present disclosure.

FIG. 9 is a perspective view of a frame-fastener 600 of the kickout step system 100 of FIG. 1, according to an embodiment of the present disclosure. For the purposes of this specification, Frame-fastener 600 may also be referred to as a "specialized washer". Frame-fastener 600 may be used optionally in conjunction with either frame-mounted kickout step 300 (FIG. 4) and supplementary-kickout step 200 (FIG. 4) in order to mount the step to frame 20 (FIG. 4) of vehicle 10 (FIG. 4).

Frame-fastener 600 includes first-plate 610, and second-plate 620, which is smaller than first-plate 610. Preferably, second-plate 620 is a square and first-plate 610 is an elongated rectangular, and they are welded to each other face-to-face, such that along one width (for example, at top and bottom) first-plate 610 and second-plate are flush, but along one length (for example, left to right) first-plate 610 extends past second-plate 620 in either direction. Here, second-plate 620 should not be centered upon first-plate 610, but may be biased at one-third upon the length of first-plate 610, or even upon a quarter-length upon the length of first-plate 610. Second-plate 620 may be dimensioned small enough to nest within a hole of frame 20 (FIG. 4). First-plate 610 may be inserted into the hollow of frame 20 (FIG. 4), and because of it's length, when rotated it will impinge upon the interior of frame 20 (FIG. 4) so that rotation will cease as a bolt 130 is tightened down upon it. A plate-nut 640 may preferably be welded to first-plate 610 to simplify assembly, or may be left a separate component. In any event, a plate-bore 630 must perforate both first-plate 610 and second-plate 620 to permit through passage of bolt 130.

Figure 10:
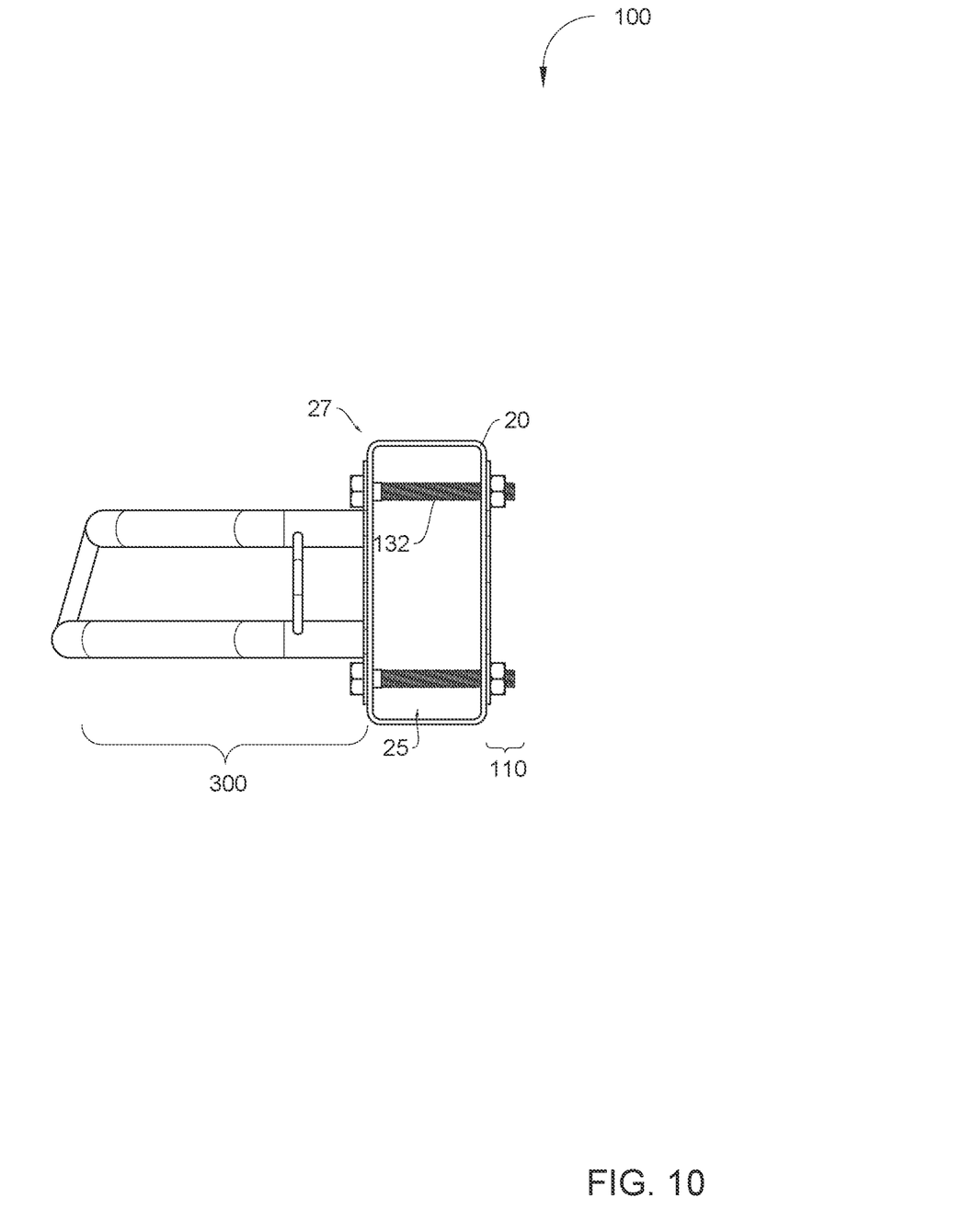
FIG. 10 is a cross-sectional view of the frame-mounted kickout step of the kickout step system of FIG. 1 being affixed to the frame of the vehicle, according to an embodiment of the present disclosure.

FIG. 10 is a cross-sectional view of the frame-mounted kickout step 300 of the kickout step system 100 of FIG. 1 being affixed to the frame 20 of the vehicle 10 (FIG. 4), according to an embodiment of the present disclosure. As shown, long bolts 132 are provided to pass all of the way through interior 25 of frame 20 to bolt to fastener-plate 110 on the opposite side and exterior 27 of frame 20.

Figure 11:
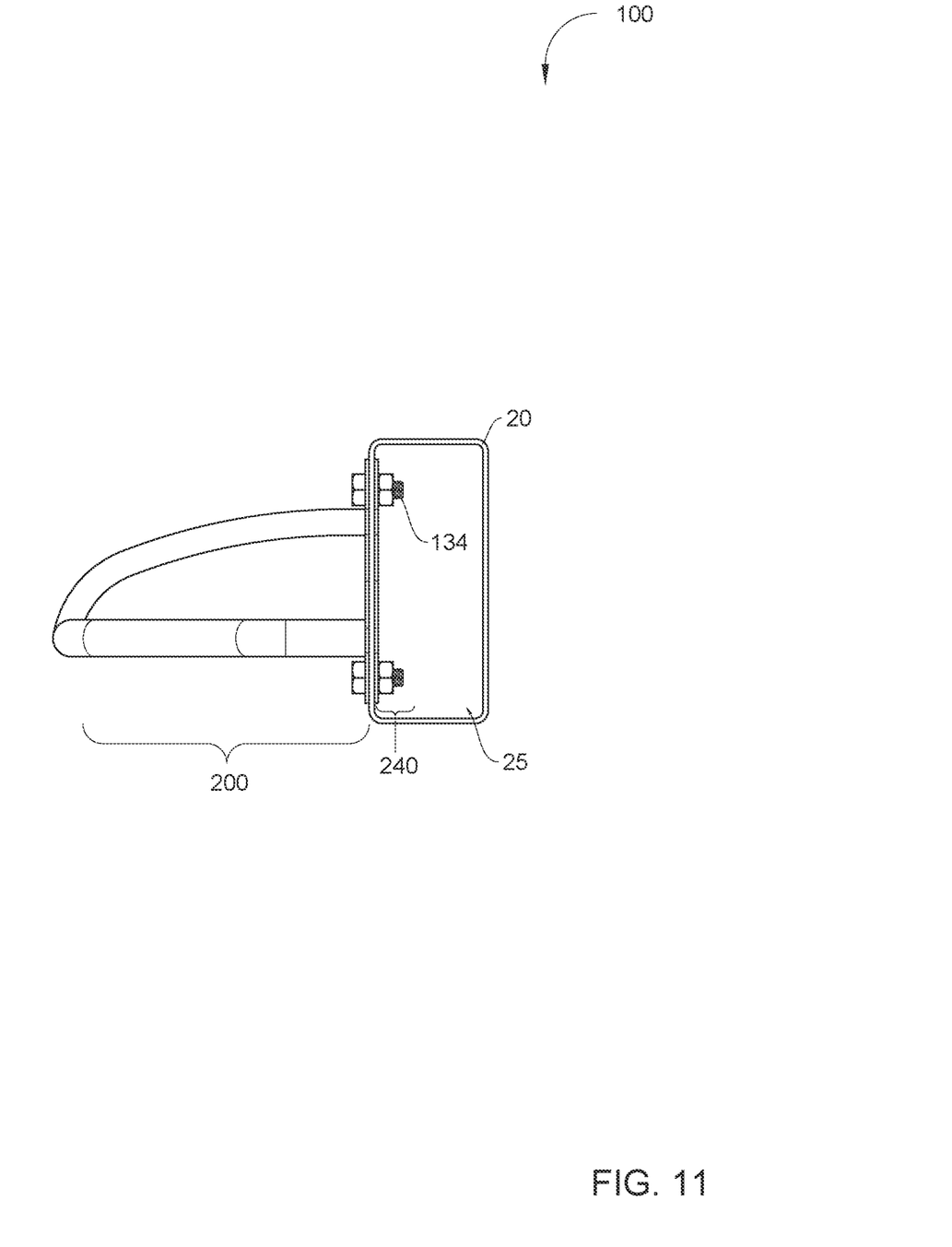
FIG. 11 is a cross-sectional view of the supplementary kickout step of the kickout step system of FIG. 1 being affixed to the frame of the vehicle, according to an embodiment of the present disclosure.

FIG. 11 is a cross-sectional view of the supplementary kickout step 200 of the kickout step system 100 of FIG. 1 being affixed to the frame 20 of the vehicle 10 (FIG. 4), according to an embodiment of the present disclosure. As shown, short bolts 134 are provided to pass only into interior 25 of frame 20 to bolt to fastener-plate 110 which is nested within interior 25 of frame 20.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or

What is claimed is new and desired to be protected by Letters Patent is set forth in the appended claims:

1. A frame-mounted kickout step for a vehicle comprising:
   a first-mount and a second-mount each having
      a flange,
         a first-face and a second-face defining opposite sides of the flange, the second faces of each of the first-mount and the second-mount respectively being coplanar in order to abut with a frame of the vehicle simultaneously, and
         bores perforating the flange; and
   a first-tubular member and a second-tubular member each spanning the first-mount to the second-mount, each of the first-tubular member and the second-tubular member having
      a front-cantilever rigidly affixed to the first-face of the first-mount,
      a rear-cantilever rigidly affixed to the first-face of the second-mount,
      a front-support affixed to the front-cantilever at an angle between zero and ninety degrees,
      a rear-support affixed to the rear-cantilever at an angle between zero and ninety degrees,
      whereby the front-support is affixed to the rear-support at an angle greater than zero,
      whereby the front-cantilever, the front-support, the rear-support, and the rear-cantilever are arranged serially and form a single unitary component.

2. The frame-mounted kickout step for a vehicle of claim 1,
   wherein the second-tubular member extends further from the first-mount and the second-mount than the first-tubular member extends from the first-mount and the second-mount, such that the second-tubular member and the first-tubular member are sufficiently separated laterally to form two sequential steps usable by a user to step into the vehicle.

3. The frame-mounted kickout step for a vehicle of claim 1, further comprising
   a first cross-member,
   a second cross-member, and
   a third cross-member,
   each of the first cross-member, the second cross-member, and the third cross-member spanning and rigidly connecting the first-tubular member and the second-tubular member;
   the first cross-member affixing to each of the first-tubular member and the second-tubular member at the respective front-cantilevers;
   the second cross-member affixing to each of the first-tubular member and the second-tubular member between the respective front-support and rear-support; and
   the third cross-member affixing to each of the first-tubular member and the second-tubular member at the respective rear-cantilevers.

4. The frame-mounted kickout step for a vehicle of claim 3, wherein
   each of the first cross-member and the third cross-member comprises a bend, such that the first cross-member and the third cross-member are each convex relative to the frame-mounted kickout step.

5. The frame-mounted kickout step for a vehicle of claim 1, wherein each of the first-mount and the second-mount comprise concave scallops between the bores.

6. The frame-mounted kickout step for a vehicle of claim 1, wherein
   the front-cantilever and the second-cantilever are parallel.

7. The frame-mounted kickout step for a vehicle of claim 1, wherein
   the front-cantilever and the second-cantilever are each affixed perpendicularly to the flange of the first-mount and the flange of the second-mount respectively.

8. A vehicle outfitting kit comprising
   the frame-mounted kickout step for a vehicle of claim 1; and
   a supplementary-kickout step for a vehicle able to be mounted alongside the frame-mounted kickout step, the supplementary-kickout step comprising
      a unitary flange-plate perforated by a first-plate slot, at least one plate-aperture, and a second-plate slot,
      a single tubular-step rigidly affixed at either end to the unitary flange-plate, and
      a single brace-member spanning the single tubular-step to the unitary flange plate,
   wherein the first-plate slot, the at least one plate-aperture, and the second-plate slot are not inline with each other.

9. A vehicle outfitting kit comprising
   the frame-mounted kickout step for vehicles of claim 1;
   a supplementary-kickout step able to mount to the frame of the vehicle, the supplementary kickout step comprising
      a unitary flange-plate perforated by at least one plate-aperture, a first-plate slot, and a second-plate slot,
      a supplementary-tubular member rigidly affixed at either end to the unitary flange-plate,
      a brace-member spanning from the unitary flange-plate to the supplementary-tubular member,
   a hand-bar mountable to an interior of a vehicle, the hand-bar having
      a flat handle-flange able to abut against a floor of the vehicle, the flat handle-flange being perforated by a handle-bore;
      a tubular member rigidly affixed perpendicularly to the flat handle-flange;
      a cap affixed to an end of the tubular member opposing the flat handle-flange.

10. A specialized washer for use in affixing the frame-mounted kickout step of claim 1 to an ovoid aperture perforating a box frame of a vehicle, the specialized washer comprising
   a rectangular flat;
   a square flat of equal width to that of the rectangular flat, and lesser length, the square flat being affixed to the rectangular flat but not flush with either longitudinal end of the rectangular flat; and
   a bore perforating the rectangular flat and the square flat together.

11. A fastener-plate able to be inserted within the frame of the vehicle and sandwich the frame of the vehicle between the fastener-plate and the frame-mounted kickout step for a vehicle of claim 1 when bolts affix the fastener-plate to the frame-mounted kickout step for a vehicle, the fastener-plate comprising
   a fastener-plate,
   two fastener-bores perforating the fastener-plate at a separation from each other matching that of the bores of the frame-mounted kickout step,
   two nuts corresponding with a respectively coaxial with the two fastener-bores able to threadably receive bolts.

* * * * *